United States Patent
Harris

(10) Patent No.: US 10,767,498 B2
(45) Date of Patent: Sep. 8, 2020

(54) TURBINE DISK WITH PINNED PLATFORMS

(71) Applicant: Rolls-Royce High Temperature Composites Inc., Cypress, CA (US)

(72) Inventor: Stephen Harris, Long Beach, CA (US)

(73) Assignee: Rolls-Royce High Temperature Composites Inc., Cypress, CA (US)

( * ) Notice: Subject to any disclaimer, the term of this patent is extended or adjusted under 35 U.S.C. 154(b) by 246 days.

(21) Appl. No.: 15/944,095

(22) Filed: Apr. 3, 2018

(65) Prior Publication Data

US 2019/0301292 A1 Oct. 3, 2019

(51) Int. Cl.
*F01D 5/30* (2006.01)
*F01D 5/28* (2006.01)
*F01D 5/14* (2006.01)

(52) U.S. Cl.
CPC ........... *F01D 5/3007* (2013.01); *F01D 5/147* (2013.01); *F01D 5/282* (2013.01); *F01D 5/3053* (2013.01); *F01D 5/3084* (2013.01); *F05D 2240/30* (2013.01); *F05D 2240/80* (2013.01); *F05D 2300/6033* (2013.01)

(58) Field of Classification Search
CPC .... F01D 11/008; F01D 5/3007; F01D 5/3053; F01D 5/147; F01D 5/282; F05D 2300/6033; F05D 2240/80; F05D 2250/23; F05D 2250/121; F05D 2250/132; F05D 2250/131; F05D 2260/36
See application file for complete search history.

(56) References Cited

U.S. PATENT DOCUMENTS

| | | | |
|---|---|---|---|
| 2,220,918 A * | 11/1940 | Smith | F01D 5/225 416/191 |
| 2,967,043 A * | 1/1961 | Dennis | F01D 11/008 416/221 |
| 3,784,320 A | 1/1974 | Rossmann et al. | |
| 4,019,832 A | 4/1977 | Salemme et al. | |
| 4,169,694 A | 10/1979 | Sanday | |
| 4,471,008 A | 9/1984 | Huther | |
| 4,541,778 A * | 9/1985 | Adams | F01D 11/008 416/134 R |
| 4,743,166 A | 5/1988 | Elston, III et al. | |
| 4,802,824 A | 2/1989 | Gastebois et al. | |
| 5,160,243 A | 11/1992 | Herzner et al. | |
| 5,240,375 A | 8/1993 | Wayte | |
| 5,275,536 A | 1/1994 | Stephens et al. | |
| 5,277,548 A | 1/1994 | Klein et al. | |
| 5,791,877 A | 8/1998 | Stenneler | |
| 6,132,175 A | 10/2000 | Cai et al. | |
| 6,290,466 B1 | 9/2001 | Ravenhall et al. | |
| 6,375,429 B1 | 4/2002 | Halila et al. | |
| 6,398,499 B1 | 6/2002 | Simonelli et al. | |
| 6,547,526 B2 | 4/2003 | Van Daam et al. | |
| 6,619,924 B2 | 9/2003 | Miller | |
| 6,632,070 B1 | 10/2003 | Tiemann | |
| 6,652,228 B2 | 11/2003 | Tiemann | |
| 6,860,722 B2 | 3/2005 | Forrester et al. | |
| 7,094,021 B2 | 8/2006 | Haubert | |
| 7,326,035 B2 | 2/2008 | Rodrigues et al. | |

(Continued)

*Primary Examiner* — Brian P Wolcott

(74) *Attorney, Agent, or Firm* — Barnes & Thornburg LLP

(57) ABSTRACT

A blade assembly for use in a gas turbine engine. The blade assembly includes a blade, a platform distinct from the blade and configured to extend around the blade, and a pin that couples the platform with the blade.

15 Claims, 4 Drawing Sheets

(56) References Cited

U.S. PATENT DOCUMENTS

| | | | |
|---|---|---|---|
| 7,708,529 B2 * | 5/2010 | Klingels | F01D 5/3038 |
| | | | 416/220 R |
| 7,762,781 B1 * | 7/2010 | Brown | F01D 5/147 |
| | | | 416/193 A |
| 7,874,804 B1 | 1/2011 | Brown | |
| 7,878,763 B2 | 2/2011 | Keith et al. | |
| 7,931,442 B1 | 4/2011 | Liang | |
| 7,972,113 B1 | 7/2011 | Davies | |
| 8,016,565 B2 | 9/2011 | Berg et al. | |
| 8,231,354 B2 * | 7/2012 | Campbell | B23P 15/04 |
| | | | 416/193 A |
| 8,408,874 B2 | 4/2013 | McCaffrey et al. | |
| 8,435,007 B2 | 5/2013 | Morrison | |
| 8,496,443 B2 * | 7/2013 | Campbell | F01D 5/081 |
| | | | 416/248 |
| 8,834,125 B2 * | 9/2014 | Alvanos | C04B 37/00 |
| | | | 416/220 R |
| 8,851,853 B2 * | 10/2014 | Alvanos | F01D 5/225 |
| | | | 416/220 R |
| 8,936,440 B2 * | 1/2015 | Alvanos | F01D 5/147 |
| | | | 416/193 A |
| 8,951,015 B2 | 2/2015 | Brandl et al. | |
| 9,239,062 B2 | 1/2016 | Lamboy et al. | |
| 9,745,856 B2 | 8/2017 | Uskert et al. | |
| 2007/0020102 A1 | 1/2007 | Beeck et al. | |
| 2007/0048142 A1 | 3/2007 | Dambrine et al. | |
| 2009/0016890 A1 | 1/2009 | Douguet et al. | |
| 2009/0060745 A1 | 3/2009 | Douguet et al. | |
| 2012/0082551 A1 | 4/2012 | Macchia et al. | |
| 2013/0064667 A1 * | 3/2013 | Campbell | F01D 5/3007 |
| | | | 416/193 A |
| 2016/0305260 A1 * | 10/2016 | Freeman | F01D 5/3007 |
| 2019/0292922 A1 * | 9/2019 | Freeman | F01D 11/008 |
| 2019/0323366 A1 * | 10/2019 | Karkos | F01D 5/3007 |

\* cited by examiner

TURBINE DISK WITH PINNED PLATFORMS

FIELD OF THE DISCLOSURE

The present disclosure relates generally to gas turbine engines, and more specifically to composite blades for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

The turbine may include turbine wheels having disks and a plurality of blades that extend radially away from the disks. To withstand heat from the combustion products received from the combustor, the blades may be made from ceramic matrix composite materials that are able to interact with the hot combustion gasses. Making a root, platform, and airfoil of each blade may present design challenges.

SUMMARY

The present disclosure may comprise one or more of the following features and combinations thereof.

A blade assembly for use in a gas turbine engine may include a blade, a platform, and a pin. The blade may comprise ceramic matrix composite materials. The blade may include and an airfoil that extends outwardly away from the root in a radial direction relative to an axis. The blade may be formed to include a first passageway that extends through the blade. The platform comprises ceramic matrix composite materials and defines at least a portion of a flow path around the airfoil to guide hot, high-pressure gasses around the airfoil while minimizing thermal transfer of the hot, high-pressure gasses to the root of the blade during use of the blade assembly in a turbine. The platform may be formed to include a second passageway that extends through the platform. The pin is located in the second passageway and the first passageway to couple the platform with the blade.

In some embodiments, the platform may include an outer radial surface and an inner radial surface spaced apart radially from the outer radial surface. The platform may be formed to include a blade-receiving passageway that extends through the outer radial surface and the inner radial surface. The portion of the blade may be located in the blade-receiving passageway.

In some embodiments, the pin, the first passageway, and the second passageway may extend in an axial direction relative to the central axis. In some embodiments, the pin, the first passageway, and the second passageway may extend in a circumferential direction relative to the central axis.

In some embodiments, the platform may include a first side wall and a second side wall that extend radially between the outer radial surface and the inner radial surface. The second passageway may extend into at least one of the first side wall and the second side wall.

In some embodiments, the first side wall may be formed to include a cutout that extends into the first side wall in a circumferential direction relative to the central axis toward the second side wall. The second side wall may be formed to include a cutout that extends circumferentially into the second side wall. The cutouts may be sized to receive a side wall of an adjacent platform.

In some embodiments, the second passageway may open into the blade-receiving passageway. In some embodiments, the first passageway may be a non-circular elongated slot.

In some embodiments, the blade and the platform are independent components. The blade and the platform are independent components may not be substantially co-infiltrated together.

According to another aspect of the present disclosure, a blade assembly for a gas turbine engine may include a blade comprising ceramic materials, a platform comprising ceramic materials, and a pin. The platform may be formed to include a blade-receiving passageway that extends through the platform. The platform may be arranged around the blade so that a portion of the blade is located in the blade-receiving passageway. The pin may be located in the platform and the blade to couple the platform with the blade.

In some embodiments, the blade includes a leading edge and a trailing edge spaced apart axially from the leading edge relative to an axis. The pin may extend into the platform and the blade in an axial direction relative to the axis.

In some embodiments, the pin may have a non-circular cross-section when viewed along the axis. In some embodiments, the blade includes a leading edge and a trailing edge spaced apart axially from the leading edge relative to an axis. The pin may extend into the platform and the blade in a circumferential direction relative to the axis.

In some embodiments, the platform includes a first side wall and a second side wall spaced apart from the first side wall. The platform may be formed to include a passageway that extends through the first side wall and the second side wall. The pin may be located in the passageway.

In some embodiments, the platform includes a first side wall and a second side wall spaced apart from the first side wall. The first side wall may be formed to include a cutout that extends toward the second side wall. The second side wall may be formed to include a cutout that extends toward the first side wall.

In some embodiments, the blade may be formed to define a first passageway that extends through the blade. The platform may be formed to define a second passageway that extends through the platform. The pin may be located in the first passageway and the second passageway. The first passageway may be partially offset radially from the second passageway relative to a longitudinal axis of the pin when the pin is located in the first passageway and the second passageway. In some embodiments, the second passageway may open into the blade-receiving passageway.

According to another aspect of the present disclosure, a method may include a number of steps. The method may include providing a blade comprising ceramic matrix composite materials, a platform comprising ceramic matrix composite materials, and a pin, the blade formed to include a first passageway that extends through the blade, and the platform formed to include a blade-receiving passageway that extends through the platform and a second passageway that extends through the platform, inserting the blade through the blade-receiving passageway formed in the platform, and locating the pin in the first passageway and the second passageway to couple the platform with the blade to provide a blade assembly.

In some embodiments, the locating step comprises bicasting the pin with the blade and the platform. In some embodiments, the method may further comprise infiltrating a blade mesh to form the blade before the inserting step and infiltrating a platform mesh to form the platform before the inserting step.

These and other features of the present disclosure will become more apparent from the following description of the illustrative embodiments.

DETAILED DESCRIPTION OF THE DRAWINGS

Figure 1:
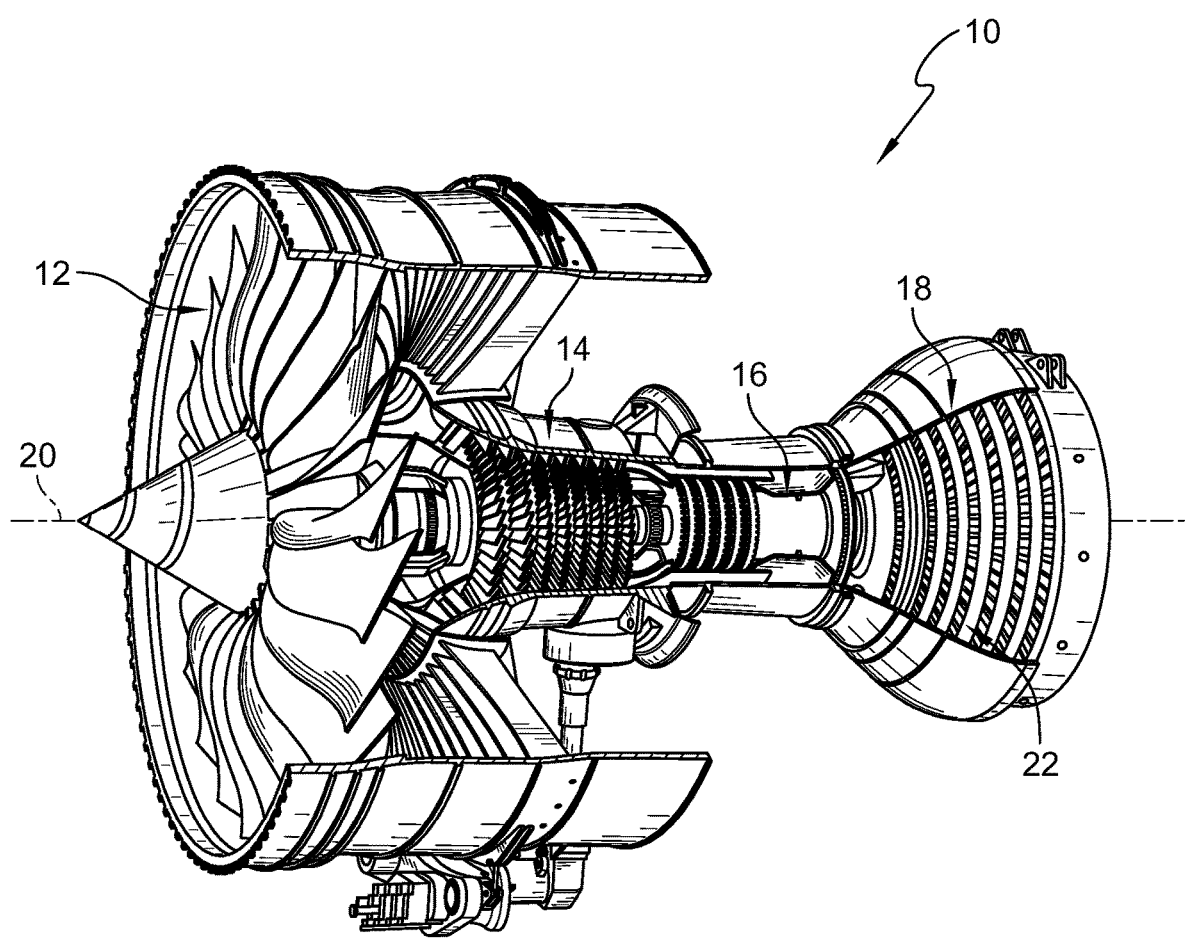
FIG. 1 is cutaway view of a gas turbine engine that includes a fan, a compressor, a combustor, and a turbine, the turbine includes a plurality of turbine wheels, and each turbine wheel includes a disk and a plurality of ceramic matrix composite blade assemblies coupled to the disk as shown in FIGS. 2 and 3.

For the purposes of promoting an understanding of the principles of the disclosure, reference will now be made to a number of illustrative embodiments illustrated in the drawings and specific language will be used to describe the same.

A blade assembly 25 in accordance with the present disclosure is included in a turbine 18 of an illustrative gas turbine 10 as shown in FIG. 1. As show in FIGS. 2 and 3, the blade assembly 25 includes a blade 26, a platform 28, and a pin 30. The platform 28 is formed separate from the blade 26 and arranged around the blade 26 to form a portion of a flow path for hot, high-pressure combustion gasses passing through the turbine 18. The pin 30 is located in the blade 26 and the platform 28 to couple the platform 28 with the blade 26 as shown in FIG. 3. The blade 26 and platform 28 comprise ceramic material, but are formed separately and are not substantially co-infiltrated with matrix materials. Accordingly, the pin 30 is the primary coupler of the blade assembly 25.

The blade assembly 25 is coupled with a disk 24 included in a turbine wheel 22 of the turbine 18 as shown in FIG. 3. The disk 24 is arranged about a central axis 20 of the gas turbine engine 10 and formed to include a plurality of slots 38. The slots 38 extend through the disk 24. Each blade assembly 25 is located in one of the slots 38 and extends radially outward away from the disk 24 as suggested in FIG. 3.

The gas turbine engine 10 designed to include the blade assembly 25 includes a fan 12, a compressor 14, a combustor 16, and the turbine 18 as shown in FIG. 1. The compressor 14 compresses and delivers air to the combustor 16. The combustor 16 mixes fuel with the compressed air received from the compressor 14 and ignites the fuel. The hot, high-pressure gasses from the burning fuel are directed into the turbine 18 where the turbine blades 26 of the turbine 18 extract work to drive the compressor 14 and the fan 12. In other embodiments, the gas turbine engine 10 may include a shaft, turboprop, or gearbox in place of fan 12.

In the illustrative embodiment, the turbine 18 includes turbine wheels 22, as shown in FIG. 1, that are configured to rotate about a central axis 20 of the gas turbine engine 10 during operation of the gas turbine engine to drive the compressor 14 and the fan 12. Each turbine wheel 22 includes the disk 24 and a plurality of blade assemblies 25. Each blade assembly 25 includes the blade 26, the platform 28, and the pin 30 as suggested in FIGS. 2 and 3.

Figure 2:
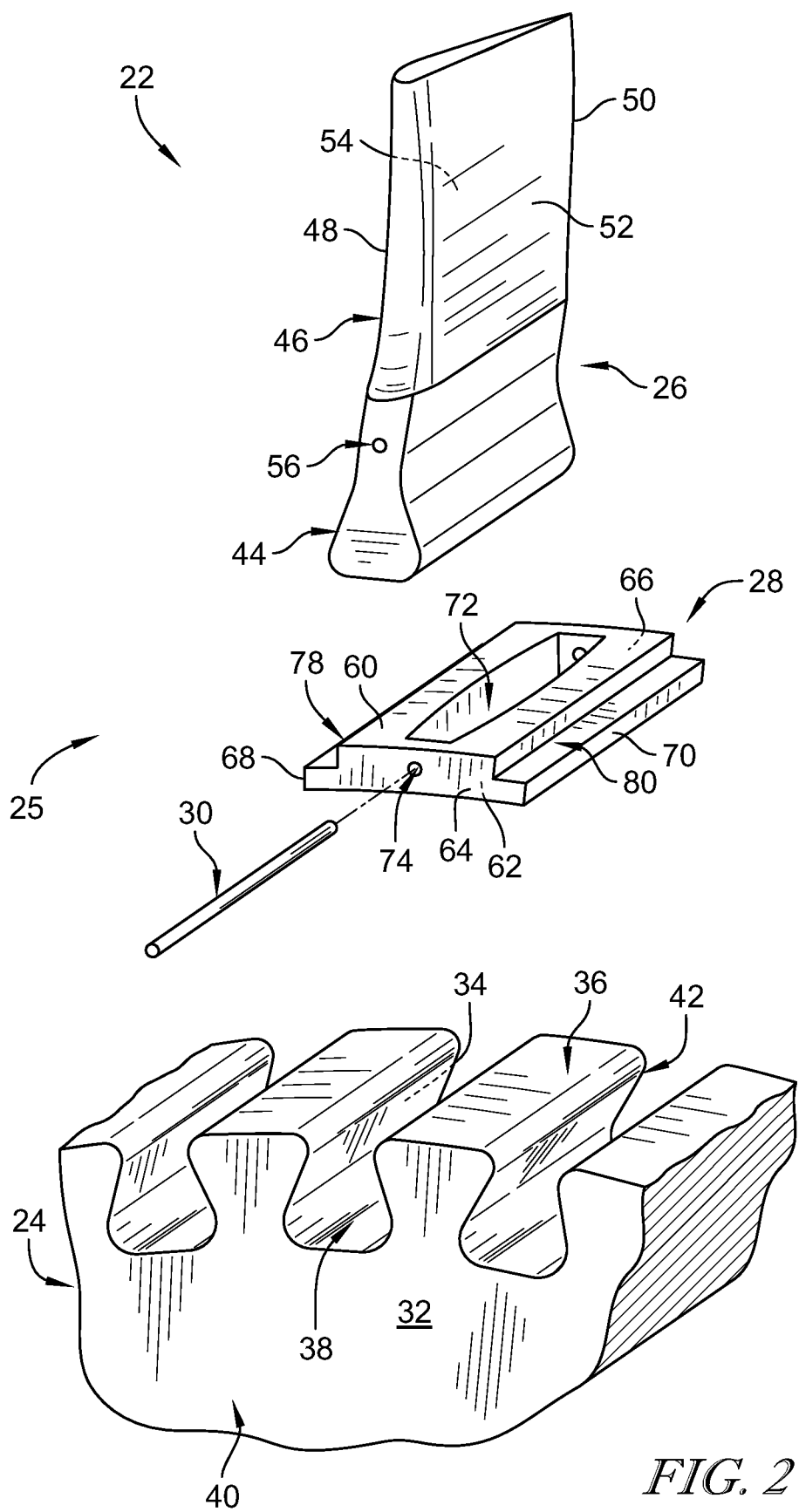
FIG. 2 is an exploded view of a turbine wheel included in the turbine of the gas turbine engine of FIG. 1 showing the disk, one of the blades, a platform that is formed separate from the blade, and a pin configured to couple the platform with the blade to form a turbine blade assembly.
Figure 3:
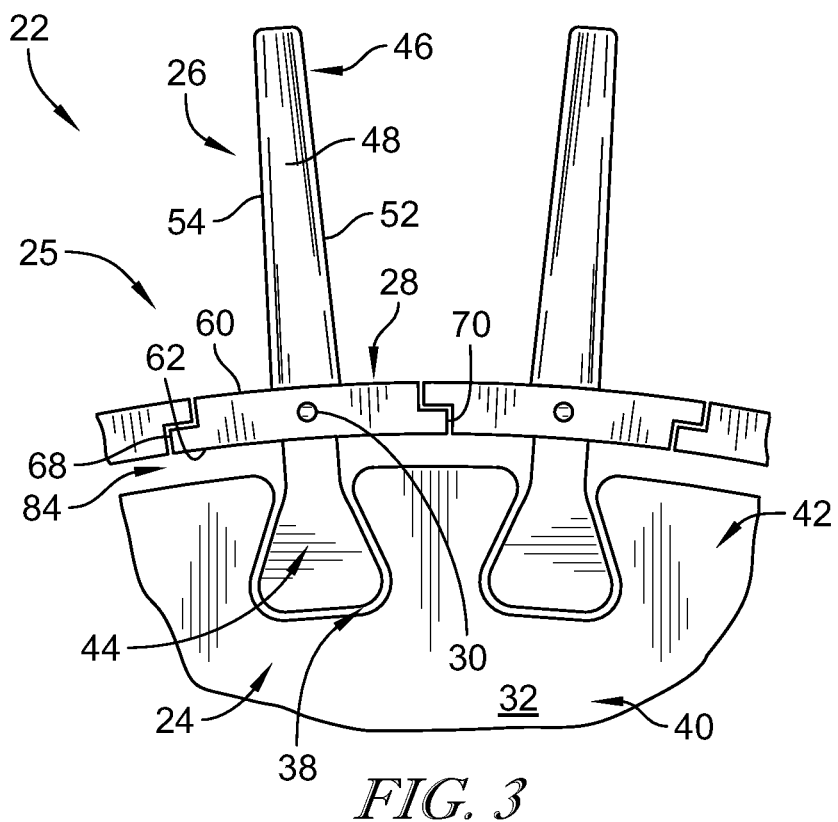
FIG. 3 is a front elevation view of the turbine wheel of FIG. 1 showing a pair of adjacent blades wherein pins extend through each respective blade and platform to couple the components together and to form blade assemblies, and further showing that adjacent platforms are configured to interlock with one another.

The disk 24 is arranged about the central axis 20 as suggested in FIGS. 1 and 2. The disk 24 includes a forward side 32, an aft side 34 spaced apart axially from the forward side 32, and an outer diameter 36 that extends between the forward side 32 and the aft side 34. The disk 24 is formed to include the plurality of slots 38 that extend through the disk 24 in a generally axial direction from the forward side 32 to the aft side 34 of the disk 24 and inwardly in a radial direction from the outer diameter 36 of the disk toward the central axis 20. The disk comprises metallic material in the illustrative embodiments.

Figure 4:
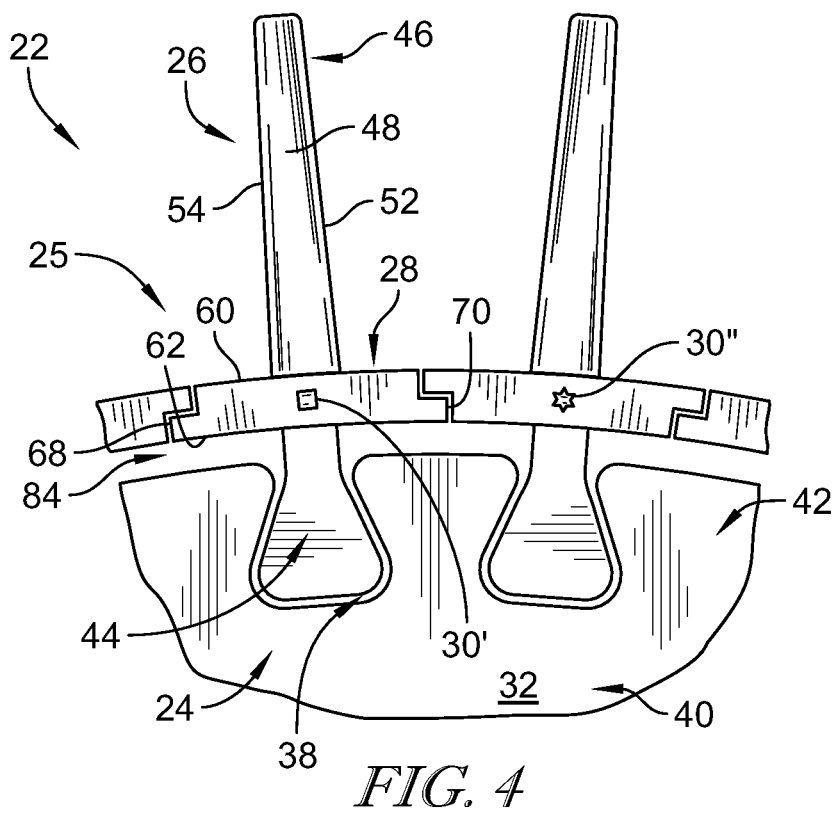
FIG. 4 is a front elevation view similar to FIG. 3 showing pins with different cross-sectional shapes which may be incorporated into the turbine blade assembly.

The disk 24 includes an annular body 40 and a plurality of disk posts 42 that extend radially outward away from the body 40 as shown in FIGS. 2-4. The body 40 and the plurality of disk posts 42 cooperate to define the plurality of slots 38 formed in the disk 24.

The blade 26 includes a root 44 and an airfoil 46 coupled to the root 44 as shown, for example, in FIG. 2. The root 44 is located in one of the slots 38 to couple the blade 26 with the disk 24 as shown in FIG. 3. The airfoil 46 extends outwardly away from the root 44 in a radial direction. In the illustrative embodiment, the root 44 and the airfoil 46 are integrally formed to provide a monolithic component.

The airfoil 46 includes a leading edge 48 and a trailing edge 50 spaced axially part from the leading edge 48 relative to the axis 20 as shown in FIG. 2. The airfoil 46 further includes a pressure side 52 and a suction side 54 spaced apart from the pressure side 52. The pressure side 52 and the suction side 54 extend between and interconnect the leading edge 48 and the trailing edge 50. The leading edge 48, trailing edge 50, pressure side 52, and suction side 54 extend continuously to mate with the root 44. Because the platform 28 is formed separate from the blade 26, the pressure side 52 and the suction side 54 join with the root 44 and no portion of the blade 26 extends circumferentially or axially outward away from the root 44 in the illustrative embodiments.

Figure 5:
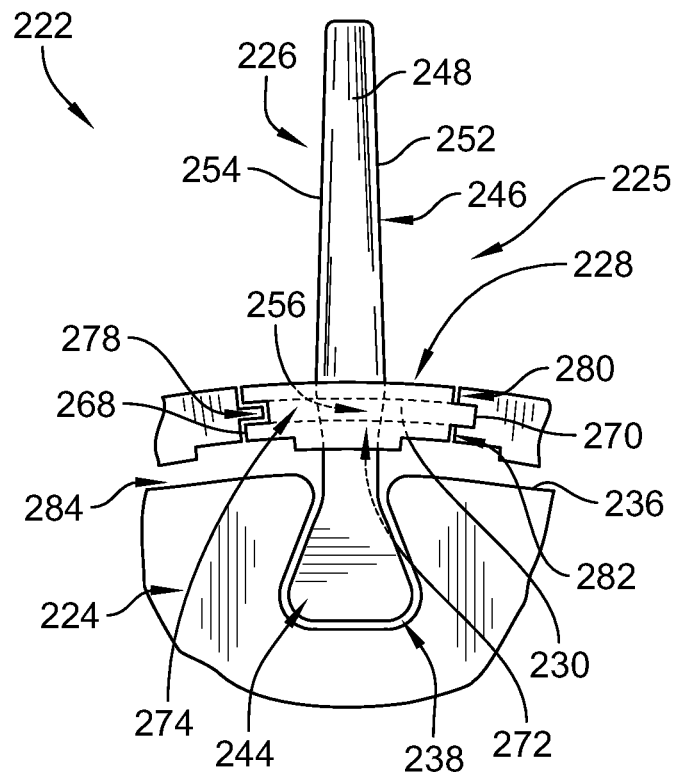
FIG. 5 is a front elevation view of a turbine wheel showing a blade, a platform, and a pin that extends in a circumferential direction through the blade and platform to form a blade assembly.

The blade 26 is formed to include a first passageway 56 that extends through the blade 26 as shown in FIG. 2. In some embodiments, the first passageway 56 extends axially relative to the axis 20 through the blade 26 as shown in FIGS. 2 and 3. In other embodiments, the first passageway 56 extends circumferentially relative to the axis 20 through the blade 26 as shown in FIGS. 4 and 5. The first passageway 56 is formed in the root 44 of the blade 26. In other embodiments, the first passageway 56 may be formed in the airfoil 46.

Figure 6:
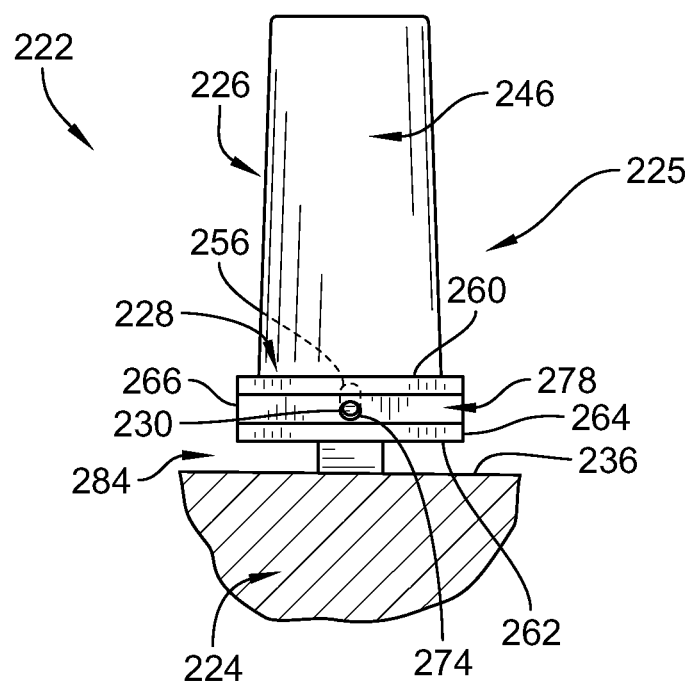
FIG. 6 is a side elevation view of the turbine wheel of FIG. 5 showing the pin located in the blade and the platform to form the blade assembly.

The first passageway 56 is sized to receive the pin 30. In some embodiments, the first passageway 56 is circular as shown in FIG. 3. In some embodiments, the first passageway 56 is a non-circular elongated slot as shown in FIG. 6. In some embodiments, the first passageway 56 is non-circular such as, for example, triangular, square 30', star shaped 30", elliptical, eccentric, etc. as shown and suggested in FIG. 4. The non-circular shapes may block rotation of the platform 28.

The blade 26 comprises ceramic materials adapted to withstand the high temperature combustion gasses surrounding the blade 26. Illustratively, the blade 26 comprises ceramic matrix composite materials. In some embodiments, the blades 26 are formed from metallic materials.

The platform 28 is arranged about the blade 26 to define the flow path around the airfoil 46 of the blade 26 as shown in FIG. 3. As a result, the platform 28 resists movement of the hot, high-pressure gasses of the turbine 18 toward the root 44 and minimizes thermal transfer of the hot, high-pressure gasses to the root 44 of the blade 26. The platform 28 includes an outer radial surface 60, an inner radial surface 62, a forward side wall 64, an aft side wall 66 spaced apart axially from the forward side wall 64, a left side wall 68, and a right side wall 70 spaced apart circumferentially from the left side wall 68 as shown in FIGS. 2 and 3. The inner radial surface 62 faces the disk 24. The outer radial surface 60 is spaced apart radially from the inner radial surface 62. The forward side wall 64 and the aft side wall 66 extend between and interconnect the outer radial surface 60 and the inner radial surface 62. The left side wall 68 and the right side wall 70 extend between and interconnect the outer radial surface 60 and the inner radial surface 62.

The inner radial surface 62 is spaced apart from the outer diameter 36 of the disk 24 to form an air gap 84 between the inner radial surface 62 and the outer diameter 36 as shown in FIG. 3. The air gap 84 may provide insulation and minimize the thermal load on the disk 24.

The platforms 28 comprise ceramic materials adapted to withstand high temperature combustion gasses. Illustratively, the platform 28 comprises ceramic matrix composite materials. In some embodiments, the platforms 28 are formed from metallic materials. The platform 28 is formed independent of the blade 26. The platform 28 and the blade 26 are not substantially co-infiltrated.

The platform 28 is formed to include a blade-receiving passageway 72 that extends radially through the outer radial surface 60 and the inner radial surface 62 of the platform 28 as shown in FIG. 2. A portion of the blade 26 is located in the blade-receiving passageway 72.

The platform 28 is formed to include a second passageway 74 that extends through the platform 28 as shown in FIG. 2. The second passageway 74 extends axially through the forward side wall 64 and the aft side wall 66. In some embodiments, the second passageway extends into at least one of the left side wall 68 and the right side wall 70. The second passageway 74 is sized to receive the pin 30. The second passageway 74 opens into the blade-receiving passageway 72 in illustrative embodiments.

In some embodiments, the second passageway 74 is circular as shown in FIG. 3. In some embodiments, the second passageway 74 is a non-circular elongated slot. In some embodiments, the second passageway 74 is non-circular such as, for example, triangular, square, star shaped, elliptical, eccentric, etc. as shown in FIG. 4. In the illustrative embodiment, the second passageway 74 and the first passageway 56 have similar shapes. In other embodiments, the second passageway 74 and the first passageway 56 have dissimilar shapes.

In illustrative embodiments, the platform 28 interlocks with adjacent platforms 28 as shown in FIGS. 3 and 4. The interlocking platforms 28 may block rotation of the platforms 28 about the pins 30. The left side wall 68 is formed to include a cutout 78 that extends into the left side wall 68 in a circumferential direction relative to the central axis 20 toward the right side wall 70. The right side wall 70 is formed to include a cutout 80 that extends circumferentially into the right side wall 70 toward the left side wall 68. The cutouts 78, 80 are sized to receive the side wall 68, 70 of an adjacent platform 28.

The cutouts 78, 80 may be formed toward the outer radial surface 60 in some platforms 28 and they may be formed toward the inner radial surface 62 in other platforms as shown in FIGS. 3 and 4. In other embodiments, one cutout 78, 80 may be formed toward the outer radial surface 60 and the other cutout 78, 80 may be formed toward the inner radial surface 62 of the platform 28.

The pin 30 is located in the first passageway 56 and the second passageway 74 to couple the platform 28 with the blade 26 to provide the blade assembly 25 as shown in FIG. 3. The pin 30 extends into the platform 28 and the blade 26 in an axial direction relative to the central axis 20 as shown in FIG. 3. In some embodiments, the pin 30 extends into the platform 28 and the blade 26 in a circumferential direction relative to the central axis 20 as shown in FIGS. 5 and 6. In some embodiments, the first passageway 56 is partially offset radially from the second passageway 74 relative to the longitudinal axis of the pin 30 when the pin 30 is located in the first passageway 56 and the second passageway 74 as shown in FIGS. 5 and 6. The pin 30 may be brazed with or otherwise coupled with the blade 26 and the platform 28. In some embodiments, the pin 30 is formed by bicast with the blade 26 and the platform 28.

In some embodiments, the pin 30 is circular when viewed along a longitudinal axis of the pin 30 as shown in FIG. 3. In some embodiments, the pin 30 is non-circular when viewed along a longitudinal axis of the pin 30. For example, the pin 30 may be triangular, square, star shaped, elliptical, eccentric, etc. as shown in FIG. 4. In the illustrative embodiment, the pin 30, the second passageway 74, and the first passageway 56 have similar shapes. In other embodiments, the pin 30, the second passageway 74, and the first passageway 56 have dissimilar shapes.

A method in accordance with the present disclosure includes a number of steps. The method includes providing the blade 26 comprising ceramic matrix composite materials, the platform 28 comprising ceramic matrix composite materials, and the pin 30. The blade 26 is formed to include the first passageway 56 that extends through the blade 26. The platform 28 is formed to include the blade-receiving passageway 72 that extends through the platform 28 and the second passageway 74 that extends through the platform 28. The method includes inserting the blade 26 through the blade-receiving passageway 72 formed in the platform 28. The method further includes locating the pin 30 in the second passageway 74 and the first passageway 56 to couple the platform 28 with the blade 26 to provide the blade assembly 25.

The locating step may include bicasting the pin 30 with the blade 26 and the platform 28. The method may further include locating the blade assembly 25 adjacent another blade assembly to cause the platform 28 to overlap and interlock with a portion of the other blade assembly. The method may include infiltrating a blade mesh to form the blade 26 before the inserting step. The method may include infiltrating a platform mesh to form the platform 28 before the inserting step. As such, the blade 26 and platform 28 are rigid before the inserting step.

Another embodiment of a blade assembly 225 in accordance with the present disclosure is shown in FIGS. 5 and 6. The blade assembly 225 is substantially similar to the blade assembly 25 shown in FIGS. 2-4 and described herein. Accordingly, similar reference numbers in the 200 series indicate features that are common between the blade assembly 25 and the blade assembly 225. The description of the blade assembly 25 is incorporated by reference to apply to the blade assembly 225, except in instances when it conflicts with the specific description and the drawings of the blade assembly 225.

A turbine wheel 222 includes a disk 224 and the blade assembly 225 as shown in FIGS. 5 and 6. The blade assembly 225 includes a blade 226, a platform 228, and a pin 230 as shown in FIGS. 5 and 6. The disk 224 is arranged about the central axis 20 of the gas turbine engine 10 and formed to include a plurality of slots 238 that extends through the disk 224. The blade 226 is located in the one of the slots 238 and extends radially outward away from the disk 224. The platform 228 is formed separate from the blade 226 and arranged around the blades 226 to form a portion of a flow path for gases to pass through the turbine 218. The pin 230 is located in the blade 226 and platform 228 to couple the platform 228 with the blade 226 as shown in FIGS. 5 and 6.

The blade 226 includes a root 244 and an airfoil 246 coupled to the root 244 as shown, for example, in FIG. 5. The root 244 is located in one of the slots 238 to couple the blade 226 with the disk 224. The airfoil 246 extends outwardly away from the root 244 in a radial direction. In the illustrative embodiment, the root 244 and the airfoil 246 are integrally formed to provide a monolithic component.

The blade 226 is formed to include a first passageway 256 that extends through the blade 226 as shown in FIG. 5. The first passageway 256 extends circumferentially relative to the axis 20 through the blade 226 between a pressure side and a suction side of the blade 226. The first passageway 256 is formed in the root 244 of the blade 226. In other embodiments, the first passageway 256 may be formed in the airfoil 246.

The first passageway 256 is sized to receive the pin 230. The first passageway 256 is an elongated slot as shown in FIG. 6. In some embodiments, the first passageway 256 is circular. In some embodiments, the first passageway 256 is non-circular such as, for example, triangular, square, star shaped, elliptical, eccentric, etc.

The platform 228 includes an outer radial surface 260, an inner radial surface 262, a forward side wall 264, an aft side wall 266 spaced apart axially from the forward side wall 264, a left side wall 268, and a right side wall 270 spaced apart circumferentially from the left side wall 268 as shown in FIGS. 5 and 6. The inner radial surface 262 faces the disk 224. The outer radial surface 260 is spaced apart radially from the inner radial surface 262. The forward side wall 264 and the aft side wall 266 extend between and interconnect the outer radial surface 260 and the inner radial surface 262. The left side wall 268 and the right side wall 270 extend between and interconnect the outer radial surface 260 and the inner radial surface 262.

The inner radial surface 262 is spaced apart from the outer diameter 236 of the disk 224 to form an air gap 284 between the inner radial surface 262 and the outer diameter 236 as shown in FIG. 5. The air gap 284 may provide insulation and minimize the thermal load on the disk 224.

The platform 228 is formed to include a blade-receiving passageway 272 that extends radially through the outer radial surface 260 and the inner radial surface 262 of the platform 228. A portion of the blade 226 is located in the blade-receiving passageway 272.

The platform 228 is formed to include a second passageway 274 that extends through the platform 228 as shown in FIG. 5. The second passageway 274 is sized to receive the pin 230. The second passageway 274 opens into the blade-receiving passageway 72 in illustrative embodiments. The second passageway 274 extends circumferentially through the left side wall 268 and the right side wall 270.

The second passageway 274 is circular as shown in FIG. 6. In some embodiments, the second passageway 274 is circular or non-circular such as, for example, triangular, square, star shaped, elliptical, eccentric, etc. In the illustrative embodiment, the second passageway 274 and the first passageway 256 are offset radially when the pin is located in the first passageway 256 and the second passageway 274.

In illustrative embodiments, the platform 228 interlocks with adjacent platforms 228 as suggested in FIG. 5. The interlocking platforms 228 may block rotation of the platforms 228 about the pins 230. The left side wall 268 is formed to include a cutout 278 that extends into the left side wall 268 in a circumferential direction relative to the central axis 20 toward the right side wall 270. The right side wall 270 is formed to include a pair of cutouts 280, 282 that extend circumferentially into the right side wall 270 toward the left side wall 268. The cutouts 278, 280, 282 are sized to interlock with an adjacent platform 228. The second passageway 274 is located in the cutout 278 in the embodiment shown in FIG. 6.

The pin 30 is located in the first passageway 256 and the second passageway 274 to couple the platform 228 with the blade 226 as shown in FIG. 5. The pin 230 extends into the platform 228 and the blade 226 in a circumferential direction relative to the central axis 20. The pin 230 is circular when viewed along a longitudinal axis of the pin 230 as shown in FIG. 6. In some embodiments, the pin 230 is non-circular when viewed along a longitudinal axis of the pin 230. For example, the pin 230 may be triangular, square, star shaped, elliptical, eccentric, etc.

Ceramic matrix composite (CMC) material may sustain higher temperatures as compared to traditional metal alloys. It may be desirable in gas turbine engines to use ceramic matrix composite materials where higher fuel efficiencies can be reached with higher temperatures. The turbine section of the engine experiences high temperatures, so ceramic matrix composites may provide a benefit in this area. In using a ceramic matrix composite blade, it may be desirable to separate the platform from the blade to ease manufacturing issues. The present disclosure provides a platform that is pinned to a ceramic matrix composite blade, but is not integrated into the blade during manufacture.

One embodiment of the present disclosure uses platforms that are pinned to each blade individually in the axial direction to minimize the amount of geometric complexity of the blade itself as shown in FIG. 3. This configuration may also reduce the amount of stress transferred to the blade through flexure of the platform. The platforms can be alternated between being scalloped on the upper and lower sides to eliminate free rotation of the platforms. In other embodiments, the platforms could use squared pins or steps in the blade itself. In other embodiments, the platforms are pinned to the blades in the radial direction to further prevent chatter due to blade flutter from aerodynamic loads as shown in FIGS. 5 and 6.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A blade assembly for use in a gas turbine engine, the blade assembly comprising
    a blade comprising ceramic matrix composite materials, the blade includes a root and an airfoil that extends outwardly away from the root in a radial direction relative to an axis, and the blade is formed to include a first passageway that extends through the blade,
    a platform comprising ceramic matrix composite materials, the platform defines at least a portion of a flow path around the airfoil to guide hot, high-pressure gasses around the airfoil while minimizing thermal transfer of the hot, high-pressure gasses to the root of the blade during use of the blade assembly in a turbine, and the platform formed to include a second passageway that extends through the platform, and
    a pin located in the second passageway and the first passageway to couple the platform with the blade,
    wherein the platform includes an outer radial surface and an inner radial surface spaced apart radially from the outer radial surface, the platform is formed to include a blade-receiving passageway that extends through the outer radial surface and the inner radial surface, and a portion of the blade is located in the blade-receiving passageway,
    wherein the platform includes a first side wall and a second side wall that extend radially between the outer radial surface and the inner radial surface and the second passageway extends into at least one of the first side wall and the second side wall, and
    wherein the second passageway opens into the blade-receiving passageway.

2. The blade assembly of claim 1, wherein the pin, the first passageway, and the second passageway extend in an axial direction relative to the axis.

3. The blade assembly of claim 1, wherein the pin, the first passageway, and the second passageway extend in a circumferential direction relative to the axis.

4. The blade assembly of claim 1, wherein the first side wall is formed to include a cutout that extends into the first side wall in a circumferential direction relative to the axis toward the second side wall, the second side wall is formed to include a cutout that extends circumferentially into the second side wall, and the cutouts are sized to receive a side wall of an adjacent platform.

5. The blade assembly of claim 1, wherein the first passageway is a non-circular elongated slot.

6. The blade assembly of claim 1, wherein the blade and the platform are independent components that are not substantially co-infiltrated together.

7. The blade assembly of claim 1, wherein the platform includes a left side wall and a right side wall spaced apart circumferentially from the left side wall that each extend radially between the outer radial surface and the inner radial surface, and wherein the left side wall is formed to include a cutout that extends into the left side wall in a circumferential direction relative to the axis toward the second side wall, the right side wall is formed to include a cutout that extends circumferentially into the right side wall, and the cutouts are sized to receive a side wall of an adjacent platform.

8. A blade assembly for a gas turbine engine, the blade assembly comprising
    a blade comprising ceramic materials, and formed to include a first passageway extending through the blade
    a platform comprising ceramic materials, the platform formed to include a blade-receiving passageway that extends through the platform, and the platform is arranged around the blade so that a portion of the blade is located in the blade-receiving passageway, and
    a pin located in the platform and the blade to couple the platform with the blade,
    wherein the platform includes a first side wall and a second side wall spaced apart from the first side wall, the platform is formed to include a second passageway that extends through the first side wall and the second side wall, and the pin is located in the first and second passageway, and wherein the second passageway opens into the blade-receiving passageway.

9. The blade assembly of claim 8, wherein the blade includes a leading edge and a trailing edge spaced apart axially from the leading edge relative to an axis and the pin extends into the platform and the blade in an axial direction relative to the axis.

10. The blade assembly of claim 9, wherein the pin has a non-circular cross-section when viewed along the axis.

11. The blade assembly of claim 8, wherein the blade includes a leading edge and a trailing edge spaced apart axially from the leading edge relative to an axis and the pin extends into the platform and the blade in a circumferential direction relative to the axis.

12. The blade assembly of claim 8, wherein the first side wall is formed to include a cutout that extends toward the second side wall, and the second side wall is formed to include a cutout that extends toward the first side wall.

13. The blade assembly of claim 8, wherein the platform includes a left side wall and a right side wall spaced apart circumferentially from the left side wall, the left side wall is formed to include a cutout that extends toward the right side wall, and the right side wall is formed to include a cutout that extends toward the left side wall.

14. A blade assembly for a gas turbine engine, the blade assembly comprising
    a blade comprising ceramic materials,
    a platform comprising ceramic materials, the platform formed to include a blade-receiving passageway that extends through the platform, and the platform is arranged around the blade so that a portion of the blade is located in the blade-receiving passageway, and
    a pin located in the platform and the blade to couple the platform with the blade,
    wherein the blade is formed to define a first passageway that extends through the blade, the platform is formed to define a second passageway that extends through the platform, the pin is located in the first passageway and the second passageway, and the first passageway is partially offset radially from the second passageway relative to a longitudinal axis of the pin when the pin is located in the first passageway and the second passageway.

15. The blade assembly of claim 14, wherein the second passageway opens into the blade-receiving passageway.

* * * * *